(12) United States Patent
Kaneda et al.

(10) Patent No.: US 11,023,381 B2
(45) Date of Patent: Jun. 1, 2021

(54) SYSTEM AND METHOD FOR A HIT-BASED RATIO WRITE CACHE OPERATION MODE IN A STORAGE CONTROLLER

(71) Applicant: SONY SEMICONDUCTOR SOLUTIONS CORPORATION, Kanagawa (JP)

(72) Inventors: Teruya Kaneda, Kanagawa (JP); Kenichi Nakanishi, Tokyo (JP); Hideaki Okubo, Saitama (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/611,532

(22) PCT Filed: Feb. 5, 2018

(86) PCT No.: PCT/JP2018/003768
§ 371 (c)(1),
(2) Date: Nov. 7, 2019

(87) PCT Pub. No.: WO2018/211749
PCT Pub. Date: Nov. 22, 2018

(65) Prior Publication Data
US 2020/0117601 A1    Apr. 16, 2020

(30) Foreign Application Priority Data

May 16, 2017   (JP) .............................. JP2017-097260

(51) Int. Cl.
*G06F 12/0868*    (2016.01)
*G06F 12/0804*    (2016.01)

(52) U.S. Cl.
CPC ...... *G06F 12/0868* (2013.01); *G06F 12/0804* (2013.01); *G06F 2212/1021* (2013.01); *G06F 2212/608* (2013.01)

(58) Field of Classification Search
CPC .................... G06F 12/0804; G06F 12/0868
See application file for complete search history.

(56) References Cited

U.S. PATENT DOCUMENTS

| | | | |
|---|---|---|---|
| 6,516,380 B2* | 2/2003 | Kenchammana-Hoskote ............ | G06F 12/0804 711/113 |
| 2011/0258391 A1 | 10/2011 | Atkisson et al. | |
| 2013/0086307 A1* | 4/2013 | Kurashige ............. | G06F 3/0613 711/103 |

FOREIGN PATENT DOCUMENTS

| | | | |
|---|---|---|---|
| JP | 2000-122926 A | 4/2000 | |
| JP | 2001-051901 A | 2/2001 | |

(Continued)

OTHER PUBLICATIONS

International Search Report and Written Opinion of PCT Application No. PCT/JP2018/003768, dated Apr. 3, 2018, 08 pages of ISRWO.

*Primary Examiner* — Tammara R Peyton
(74) *Attorney, Agent, or Firm* — Chip Law Group

(57) ABSTRACT

An object is to suppress a process of evicting cached data so as to improve a throughput of an entire system. A storage controller includes an access request section and an operation management section. The access request section requests access to a first storage and to a second storage that is higher in response speed than the first storage, the second storage storing part of data stored in the first storage. The operation management section manages, based on a usage state of the second storage, whether or not to transfer from (Continued)

the first storage to the second storage data targeted for access but not stored in the second storage.

7 Claims, 12 Drawing Sheets

(56) References Cited

FOREIGN PATENT DOCUMENTS

| | | |
|---|---|---|
| JP | 2013-077161 A | 4/2013 |
| JP | 2015-191654 A | 11/2015 |
| WO | 2012/100257 A1 | 7/2012 |

\* cited by examiner

FIG.3

CACHE DATA MANAGEMENT TABLE 250

| BLOCK | MASTER STORAGE ADDRESS 253 | IN-USE FLAG 255 | DIRTY FLAG 256 | RE-ACCESS DISTANCE COUNTER 257 | COUNTER CLEAR COUNT 258 |
|---|---|---|---|---|---|
| #1 | | | | | |
| #2 | | | | | |
| #3 | | | | | |
| ⋮ | ⋮ | ⋮ | ⋮ | ⋮ | ⋮ |
| #(n−1) | | | | | |
| #n | | | | | |

(252)

SYSTEM AND METHOD FOR A HIT-BASED RATIO WRITE CACHE OPERATION MODE IN A STORAGE CONTROLLER

CROSS REFERENCE TO RELATED APPLICATIONS

This application is a U.S. National Phase of International Patent Application No. PCT/JP2018/003768 filed on Feb. 5, 2018, which claims priority benefit of Japanese Patent Application No. JP 2017-097260 filed in the Japan Patent Office on May 16, 2017. Each of the above-referenced applications is hereby incorporated herein by reference in its entirety.

TECHNICAL FIELD

The present technology relates to a storage system. More particularly, the technology relates to a storage system making use of multiple storage devices with different response speeds, a storage controller for use with the storage system, a processing method for controlling the storage controller, and a program for causing a computer to execute the storage controller controlling method.

BACKGROUND ART

Because storage devices used by computer systems as memory devices generally have low response speeds, methods have been proposed to improve the operating performance of the storage device using a volatile or nonvolatile memory device with a high response speed as a cache. In the cache-equipped storage device, a volatile memory is mainly used as the cache, and flash storage that employs a NAND memory or an HDD that utilizes a magnetic disk is used as the primary memory device. In the storage device, there is a large difference in response speed between the cache and the memory device. Thus, raising the ratio of access to the cache (cache hit ratio) contributes to improving the performance of the storage device. For this reason, methods have been proposed to raise the cache hit ratio. For example, a system has been proposed that stores all data in a cache if the host has a small footprint, or stores an initial portion of data into a cache and the remaining portions onto disks if the host has a large footprint (e.g., see PTL 1).

CITATION LIST

Patent Literature

[PTL 1]
Japanese Patent Laid-open No. 2015-191654

SUMMARY

Technical Problem

In the case where access areas are accessed for read or write requests in a highly random manner or where the areas to be frequently accessed vary in a short time period, it is necessary to evict cached data in order to keep the cache hit ratio high. One problem is that band occupancy resulting from the eviction process can worsen storage system performance.

The present technology has been devised in view of the above circumstances. An object of the technology is to suppress the process of evicting cached data so as to improve the throughput of an entire system.

Solution to Problem

In solving the above problems and according to a first aspect of the present technology, there are provided a storage controller, a storage system having the storage controller, a method for controlling the storage controller, and a program for implementing the storage controller controlling method. The storage controller includes: an access request section configured to request access to a first storage and to a second storage that is higher in response speed than the first storage, the second storage storing part of data stored in the first storage; and an operation management section configured to manage, based on a usage state of the second storage, whether or not to transfer from the first storage to the second storage data targeted for access but not stored in the second storage. The present technology thus provides an effect of managing, based on the usage state of the second storage, whether or not to transfer data from the first storage to the second storage.

Also according to the first aspect of the present technology, the operation management section may determine the usage state of the second storage in accordance with a hit ratio at which access target data has been stored in the second storage. The present technology thus provides an effect of managing whether or not to transfer data from the first storage to the second storage on the basis of the hit rate.

Also according to the first aspect of the present technology, the operation management section may set a cache operation mode in a case where the hit ratio is lower than a predetermined threshold value and set a parallel operation mode in a case where the hit ratio is higher than the threshold value. When access occurs to data not stored in the second storage, the access request section may request transfer of the data from the first storage to the second storage in the cache operation mode and may not request transfer of the data from the first storage to the second storage in the parallel operation mode. The present technology thus provides an effect of managing whether or not to transfer data from the first storage to the second storage in accordance with the operation mode based on the hit ratio.

Also according to the first aspect of the present technology, the storage controller may further include an access monitoring section configured to monitor access to the second storage so as to acquire a throughput of the second storage. The access request section may select, as write-back candidate data, data with low access frequency among data stored in the second storage, the access request section further requesting write-back of the write-back candidate data from the second storage to the first storage when the throughput of the second storage becomes lower than a predetermined value. The present technology thus provides an effect of writing data from the second storage back to the first storage when the throughput has dropped.

Also according to the first aspect of the present technology, the operation management section may set a cache operation mode in a case where the hit ratio is lower than a first threshold value, set a cache organization mode in a case where the hit ratio is higher than a second threshold value that is higher than the first threshold value, and set a parallel operation mode in a case where the hit ratio is between the first threshold value and the second threshold value. When access occurs to data not stored in the second storage, the access request section may request transfer of the data from the first storage to the second storage in the cache operation mode, and may not request transfer of the data from the first storage to the second storage in the parallel operation mode or in the cache organization mode. The present technology thus provides an effect of managing whether or not to transfer data from the first storage to the second storage in accordance with the operation mode based on the hit ratio.

Also according to the first aspect of the present technology, the access request section may request the write-back of the write-back candidate data from the second storage to the first storage in the cache organization mode or in the cache operation mode, and may not request the write-back of the write-back candidate data in the parallel operation mode. The present technology thus provides an effect of managing whether to write data from the second storage back to the first storage in accordance with the operation mode based on the hit ratio.

Advantageous Effect of Invention

One advantageous effect of the present technology is to improve the throughput of an entire system by suppressing the process of evicting cached data. Incidentally, the advantageous effects outlined above are not limitative of the present disclosure. Further advantages will become apparent from a reading of the present disclosure.

BRIEF DESCRIPTION OF DRAWINGS

FIG. 3 is a schematic diagram depicting an exemplary structure of a cache data management table 250 in the embodiment of the present technology.

DESCRIPTION OF EMBODIMENTS

Preferred embodiments for implementing the present technology (referred to as the embodiments) are described below. The description will be given under the following headings:

1. First embodiment (an example in which, with hit rate rising, the access to a cache following a mishit is suppressed)

2. Second embodiment (an example in which, with throughput falling, a cache write-back process is issued as needed)

1. First Embodiment

[Configuration of the Information Processing System]

Figure 1:
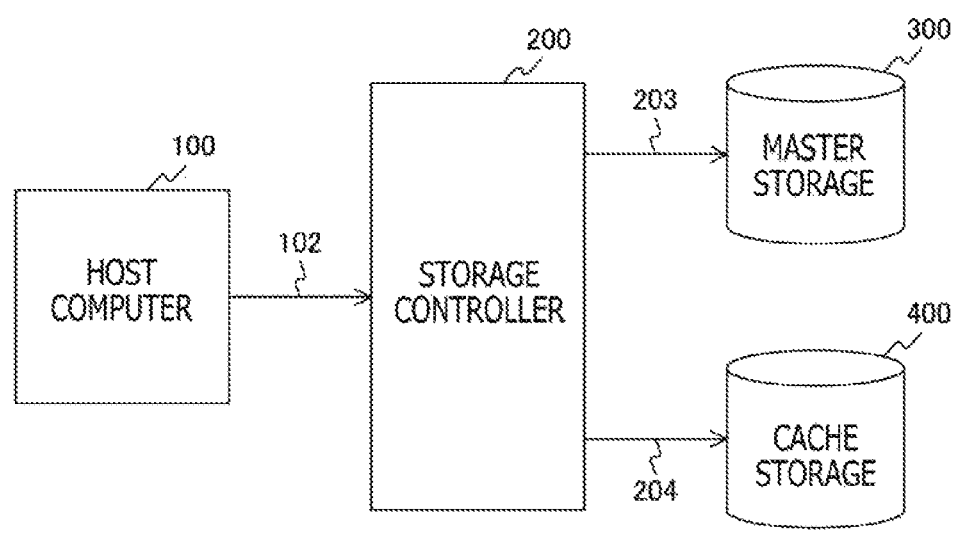
FIG. 1 is a schematic diagram depicting an exemplary overall configuration of an information processing system embodying the present technology.

FIG. 1 depicts an exemplary overall configuration of an information processing system embodying the present technology. The information processing system includes a host computer 100, a storage controller 200, a master storage 300, and a cache storage 400. The storage controller 200, the master storage 300, and the cache storage 400 constitute a storage system.

The host computer 100 issues commands requesting the storage system to perform data read and write operations. The host computer 100 has the function of transmitting to the storage controller 200, via a signal line 102, a command instructing the storage controller 200 to operate along with an address indicative of the target to be operated on with the command. The host computer 100 also has the function of transmitting and receiving data to and from the storage controller via signal lines, not depicted.

In communicating with the host computer 100, the storage controller 200 receives a command therefrom and thereby requests the master storage 300 or the cache storage 400 to perform a read or write operation. The storage controller 200 transmits to the master storage 300, via a signal line 203, a request instructing the master storage 300 to operate along with an address indicative of the target to be operated on with the request. The storage controller 200 also transmits to the cache storage 400, via a signal line 204, a request instructing the cache storage 400 to operate along with an address indicative of the target to be operated on with the request. The storage controller 200 further transmits and receives data to and from the master storage 300 or the cache storage 400 via signal lines, not depicted.

The master storage 300 stores all data handled by the storage system. The master storage 300 is a memory device larger in capacity and slower in response speed than the cache storage 400. The master storage 300 reads or writes data in accordance with the requests received from the storage controller 200 via the signal line 203. Incidentally, the master storage 300 is an example of the first storage stated in the appended claims.

The cache storage 400 holds data to be accessed with high frequency. The cache storage 400 is a memory device smaller in capacity and faster in response speed than the master storage 300. As such, the cache storage 400 operates as a cache for the master storage 300. That is, the cache storage 400 stores part of the data in the master storage 300. The cache storage 400 reads or writes data in accordance with the requests received from the storage controller 200 via the signal line 204. Incidentally, the cache storage 400 is an example of the second storage stated in the appended claims.

[Configuration of the Storage Controller]

Figure 2:
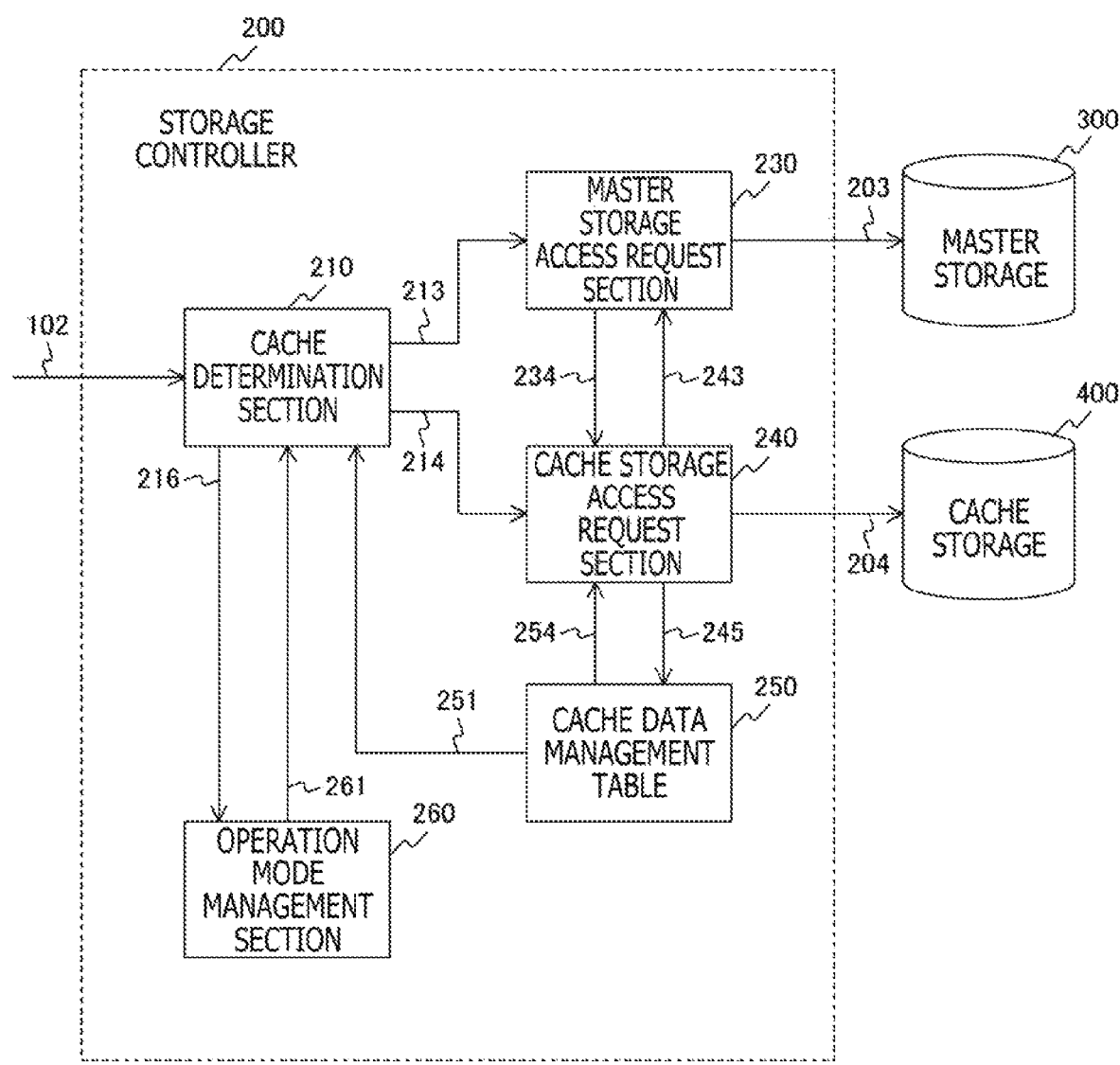
FIG. 2 is a schematic diagram depicting an exemplary configuration of a storage controller 200 in a first embodiment of the present technology.

FIG. 2 depicts an exemplary configuration of the storage controller 200 in a first embodiment of the present technology. The storage controller 200 includes a cache determination section 210, a master storage access request section 230, a cache storage access request section 240, a cache data management table 250, and an operation mode management section 260.

Given a command issued to the storage system to perform a read or write operation, the cache determination section 210 determines whether or not the data targeted for access is held in the cache storage 400. By referring to the cache data management table 250, the cache determination section 210 determines whether or not the access target data is held in the cache storage 400. The result of the determination is supplied to the operation mode management section 260 via a signal line 216.

Also, in accordance with an operation mode managed by the operation mode management section 260, the cache determination section 210 determines whether or not to access the master storage 300 or the cache storage 400. In the case of access to the master storage 300, the cache determination section 210 instructs the master storage access request section 230 to access the master storage 300 via a signal line 213. On the other hand, in the case of access to the cache storage 400, the cache determination section 210 instructs the cache storage access request section 240 to access the cache storage 400 via a signal line 214.

The cache data management table 250 is a table that manages the areas held in the cache storage 400. Because the cache storage 400 holds only the data to be accessed with high frequency among the data held in the storage system, it is necessary to keep tabs on the areas being held and to manage the frequencies with which these areas are accessed. It is for these purposes that the cache data management table 250 manages the areas held in the cache storage 400. The information managed by the cache data management table 250 is supplied to the cache determination section 210 and to the cache storage access request section 240 via signal lines 251 and 254, respectively. Specific content of the information managed by the cache data management table 250 will be discussed later.

The operation mode management section 260 manages the operation modes of the storage system. The operation modes define how the master storage 300 and the cache storage 400 constituting the storage system are to operate. As will be discussed later, the first embodiment has two modes: a parallel operation mode in which the master storage 300 and the cache storage 400 operate in parallel with each other, and a cache operation mode in which the cache storage 400 performs operations proper to a cache. The operation modes managed by the operation mode management section 260 are supplied to the cache determination section 210 via a signal line 261.

The master storage access request section 230 requests the master storage 300 for access thereto via the signal line 203 in accordance with instructions from the cache determination section 210. The cache storage access request section 240 requests the cache storage 400 for access thereto via the signal line 204 in accordance with instructions from the cache determination section 210.

Because the cache storage 400 holds only the data to be accessed with high frequency among the data held in the storage system, there occur data movements over time between the master storage 300 and the cache storage 400. When an area is to be allocated in the cache storage 400, the master storage 300 issues a cache registration request to the cache storage 400 via a signal line 234. Thereafter, when content of the cache storage 400 is written back to the master storage 300, the cache storage 400 issues a write-back request to the master storage 300 via a signal line 243. The state of the cache storage 400 is supplied as needed to the cache data management table 250 via a signal line 245.

Incidentally, the cache determination section 210, master storage access request section 230, and cache storage access request section 240 are examples of the access request section stated in the appended claims.

FIG. 3 depicts an exemplary configuration of the cache data management table 250 in the embodiment of the present technology. The cache data management table 250 is managed in units of blocks 252 each holding a master storage address 253, an in-use flag 255, a dirty flag 256, a re-access distance counter 257, and a counter clear count 258. The block 252 is a unit of management of the cache storage 400. The cache storage 400 is divided into multiple areas each managed as a block. This example assumes that a maximum of n blocks can be allocated in the cache storage 400.

The master storage address 253 holds an address allocated in the master storage 300 that corresponds to a block in the cache storage 400. Thus, the master storage address 253 indicates the relation of correspondence between the master storage 300 and the cache storage 400.

The in-use flag 255 indicates whether or not the corresponding block in the cache storage 400 is in use. If the in-use flag 255 indicates "in use," the corresponding block is valid; if the in-use flag 255 indicates "not in use," the corresponding block is invalid.

The dirty flag 256 indicates whether or not the corresponding block in the cache storage 400 matches the content in the master storage 300 that is indicated by the master storage address 253. If the dirty flag 256 indicates "clean," the content of the corresponding block is matched; if the dirty flag 256 indicates "dirty," the content of the corresponding block is not matched. When a given block is registered from the master storage 300 to the cache storage 400 for the first time, the dirty flag 256 is set to "clean." Thereafter, when data is written only to the cache storage 400, the dirty flag 256 is set to "dirty." In the case where the dirty flag 256 indicates "dirty," it means that the data in the cache storage 400 is the most recent. Thus, in this case, it is from the cache storage 400 that the data needs to be read. When a block is to be evicted from the cache storage 400, the data of the block needs to be written from the cache storage 400 back to the master storage 300.

The re-access distance counter 257 counts the number of times the entire cache has been requested to be accessed since the last time the area of interest was accessed. That is, the re-access distance counter 257 is incremented by one every time any area is accessed, and is cleared when the area of interest is accessed. Thus, the re-access distance counter 257 indicates the distance from the preceding access.

The counter clear count 258 counts the number of times the re-access distance counter 257 is cleared. That is, the counter clear count 258 indicates the frequency with which the area of interest is accessed.

The blocks are mapped between the cache storage 400 and the master storage 300 by methods such as direct mapping, set associative mapping, and full associative mapping. For example, in 2-way set associative mapping, block #1 and block #2 are handled as a set for area mapping management.

The cache determination section 210 performs control to swap blocks held in the cache storage 400 in such a manner that the cache storage 400 holds only the data to be accessed with high frequency among the data held in the storage system. In this case, when determining which block is to be evicted from the cache storage 400, the cache determination section 210 determines the eviction target by referring to the re-access distance counter 257 and counter clear count 258 and by complying with an LRU (Least Recently Used) algorithm, for example.

By referring to the master storage address 253, the cache determination section 210 verifies whether or not the address corresponding to the access request exists in the cache data management table 250 for cache hit determination. Upon a cache hit, i.e., where the data is stored in the cache storage 400, the cache determination section 210 sets the dirty flag 256 to "dirty" in the case of a write request following completion of the access request addressed to the cache storage 400. Regardless of a read operation or a write operation having been performed, the cache determination section 210 clears the re-access distance counter 257 and increments by one the counter clear count 258.

On the other hand, in the case where a cache mishit occurs and where the operation mode is the cache operation mode, the cache determination section 210 searches for an unused area by referring to the in-use flags 255 and starts using the found unused area. If unused areas are absent, the cache determination section 210 calculates area use frequencies on the basis of the re-access distance counter 257 and the counter clear count 258 to determine the area with the lowest use frequency. The cache determination section 210 then writes the cached data from the area with the lowest use frequency back to the master storage 300 and uses the vacated area as a cache area for the new request.

[Operation Modes]

Figure 4:
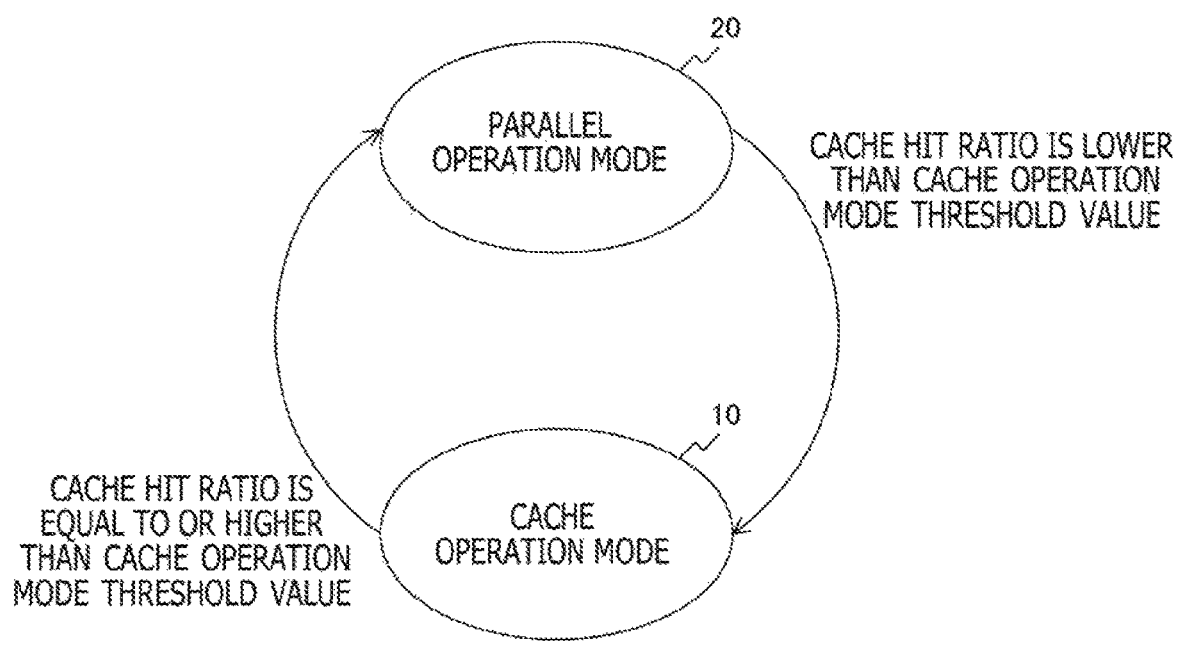
FIG. 4 is a schematic diagram depicting exemplary transitions between operation modes in the first embodiment of the present technology.

FIG. 4 depicts exemplary transitions between operation modes in the first embodiment of the present technology. The first embodiment assumes two operation modes: a cache operation mode 10 and a parallel operation mode 20.

The cache operation mode 10 is a mode in which the cache storage 400 performs operations proper to a cache. In the cache operation mode 10, a new block is allocated in the cache storage 400 upon a cache mishit. At this time, if there is no unused block in the cache storage 400, an existing block is evicted to the master storage 300. If the dirty flag 256 of the block indicates "dirty" at this point, the data of the block is written back to the master storage 300. The data transfers involved here can affect the throughput of the storage system.

The parallel operation mode 20 is a mode in which the master storage 300 and the cache storage 400 operate in parallel with each other. In the parallel operation mode 20, the data in the cache storage 400 is not swapped because the master storage 300 is accessed upon a cache mishit. Thus, a drop in throughput resulting from data swapping is suppressed, although the cache hit ratio could possibly fall from that time on.

If the cache hit ratio becomes equal to or higher than a cache operation mode threshold value during operation in the cache operation mode 10, the operation mode management section 260 causes the operation mode to transition from the cache operation mode 10 to the parallel operation mode 20. On the other hand, if the cache hit ratio drops below the cache operation mode threshold value during operation in the parallel operation mode 20, the operation mode management section 260 causes the operation mode to transition from the parallel operation mode 20 to the cache operation mode 10.

[Cache Hit Ratio]

The cache hit ratio may be calculated as follows. The operation mode management section 260 calculates the cache hit ratio in accordance with the information obtained from the cache determination section 210 via the signal line 216. That is, given a read access request or a write access request issued to the storage system, the cache determination section 210 determines whether or not to access a cache registered area. The cache determination section 210 further finds out the type of the request and a data transfer size constituting the configuration information regarding the access request. The operation mode management section 260 calculates the cache hit ratio using these pieces of information.

[Cache Operation Mode Threshold Value]

The cache operation mode threshold value may be set as follows. Each of the storage devices residing in the storage system has performance information. The performance information includes the response speed with respect to access requests of a specific size, the number of access requests of a specific size that can be processed per second (IOPS), and the throughput indicative of the data size that can be transferred per second based on IOPS. The cache hit ratio is calculated on the basis of these pieces of performance information.

For example, maximum throughput ST of the storage system (Storage system Throughput) is calculated using the following formula:

$$ST=MT+CT$$

where MT stands for maximum throughput of the master storage 300 (Master storage Throughput), and CT for maximum throughput of the cache storage 400 (Cache storage Throughput). The above calculation is feasible because the storage devices operate independently of one another when they are caused to operate in parallel with each other.

In this case, the ratio of access requests to the cache storage 400 is obtained using the following formula:

$$TCR=CT/ST$$

where TCR denotes the target cache hit ratio (Target Cache Ratio).

If it is assumed that transition is made to parallel operation when the throughput of the cache storage 400 exceeds 90% of maximum throughput, a cache operation mode threshold value ThCR (Threshold Cache Ratio) is obtained using the following formula based on the maximum throughput at this point:

$$ThCR=0.9CT/(0.9CT+MT)$$

Whereas the above calculation is based on throughput, a target cache hit ratio can be calculated in a manner similar to what was described above using the number of access requests that can be processed per second (IOPS). When each throughput is replaced with the corresponding IOPS, it is possible to obtain the cache operation mode threshold value by use of similar formulas.

[Operation]

Figure 5:
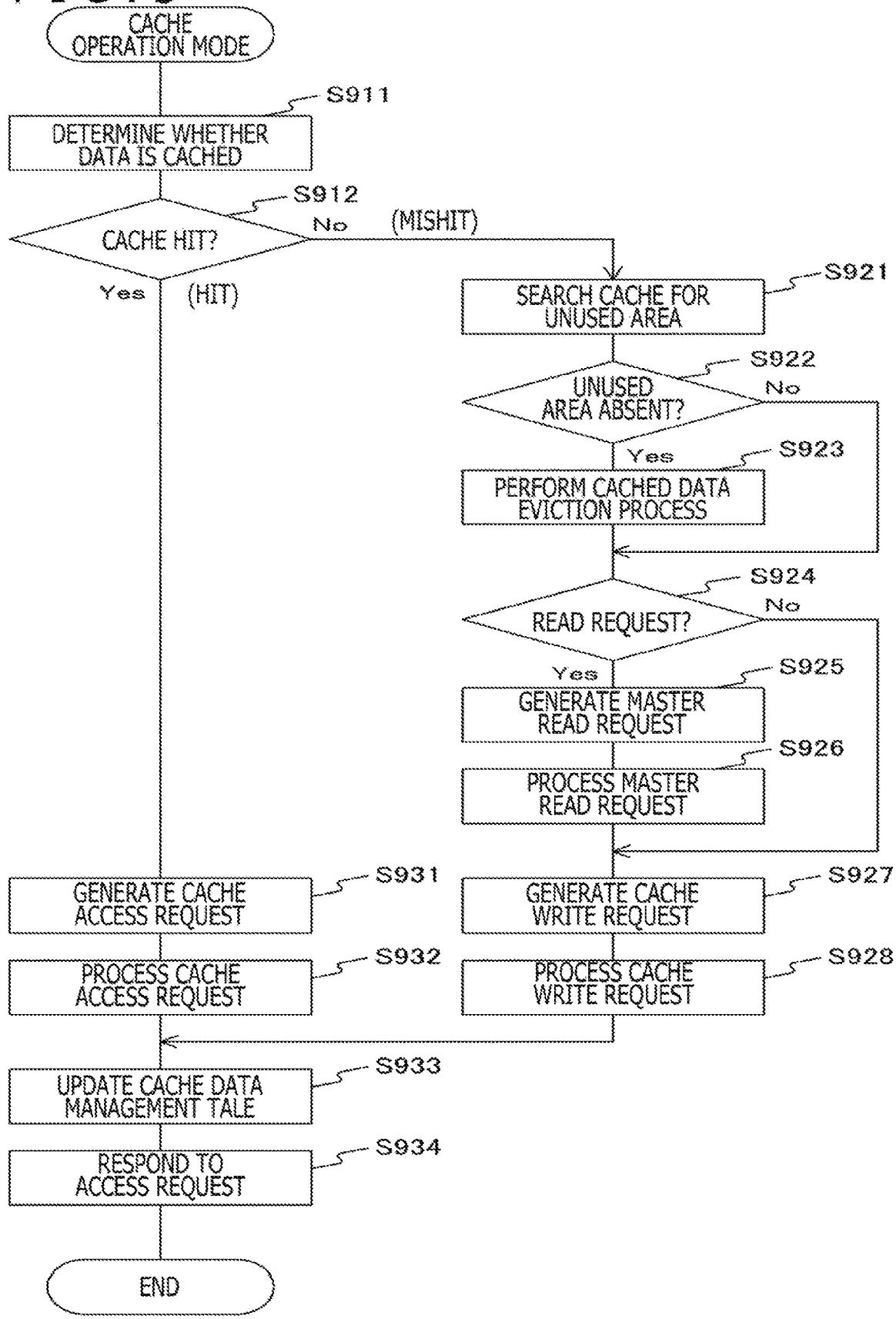
FIG. 5 is a flowchart depicting an exemplary processing procedure for handling access requests in a cache operation mode of the first embodiment of the present technology.

FIG. 5 is a flowchart depicting an exemplary processing procedure for handling access requests in the cache operation mode of the first embodiment of the present technology.

When the host computer 100 issues a command to the storage system, the cache determination section 210 determines whether or not the access target data is held in the cache storage 400 (step S911). Items of metadata such as the result of the determination, the data size of the access request, and the type of the access request are collected by the operation mode management section 260 for use in calculating the cache hit ratio and controlling the operation mode.

In the case of a cache hit (Yes in step S912), a cache storage access request is generated from the cache area registration information managed in the cache data management table 250 and from the configuration information regarding the access request (step S931). The cache storage access request section 240 then accesses the cache storage 400 (step S932).

In the case where a cache mishit occurs (No in step S912), the cache data management table 250 is searched for an unused cache area so that a cache area may be allocated in the cache storage 400 with regard to the access request (step S921). If an unused area is absent (Yes in step S922), a cached data eviction process is performed so as to allocate an area with low use frequency as a new area (step S923). The process of evicting cached data involves reading the data from the cache storage 400 and writing the data to the master storage 300. When the access involved in the eviction process is completed, the information managed in the cache data management table 250 is reset and the area starts to be used. In the case where an unused area is present (No in step S922), that unused area is used.

In the case where the access request is a read request (Yes in step S924), a read request to the master storage 300 is generated (step S925). The master storage access request section 230 then accesses the master storage 300 for a read operation (step S926).

Regardless of whether or not the access request is a read request or a write request, a write request to the cache storage 400 is generated (step S927). The cache storage access request section 240 then accesses the cache storage 400 for a write operation (step S928).

Regardless of a cache hit or a mishit having occurred, the cache data management table 250 is updated as needed (step S933). For example, the re-access distance counter 257 and the counter clear count 258 are updated as discussed above. Thereafter, a process of responding to the access request is performed (step S934).

Figure 6:
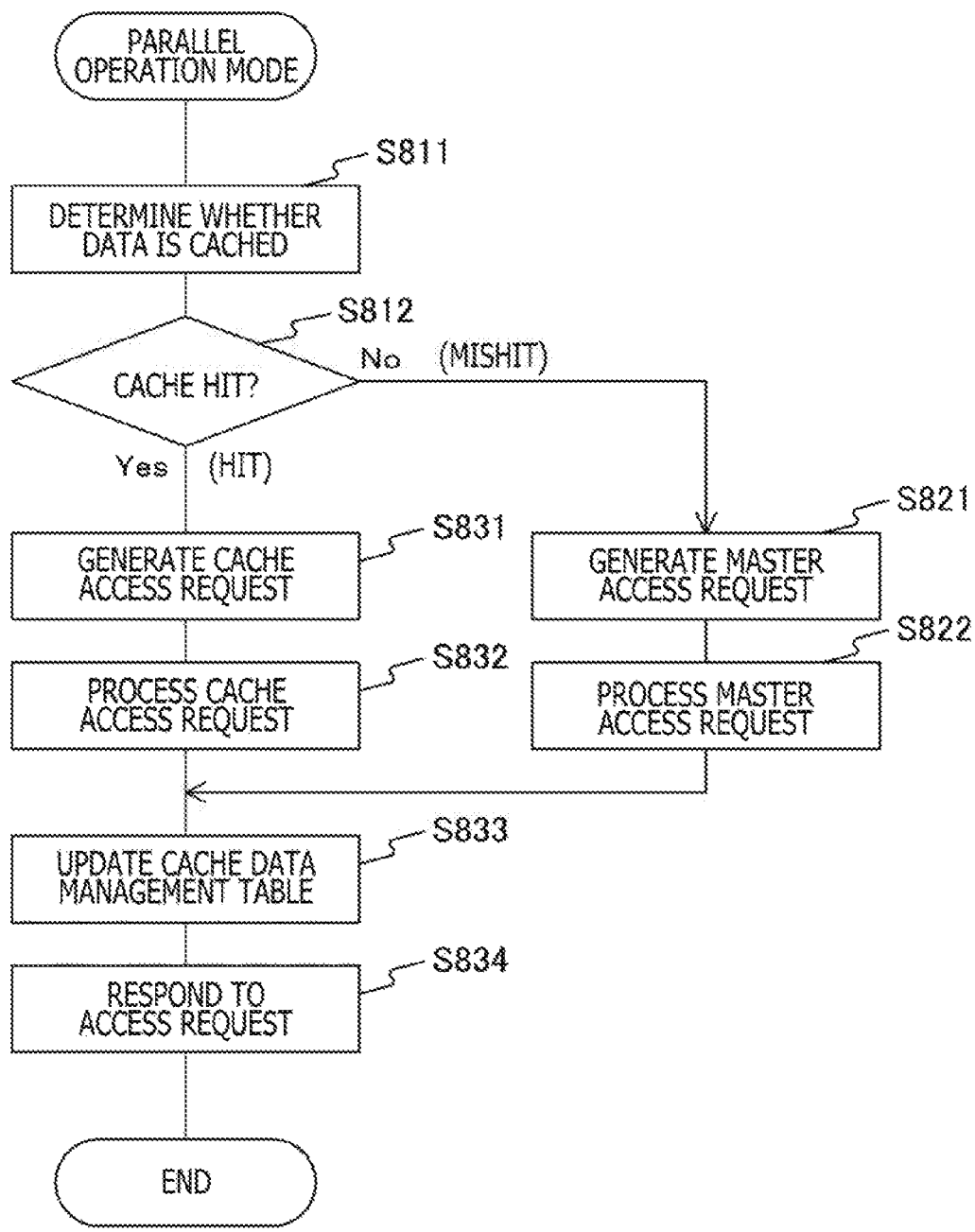
FIG. 6 is a flowchart depicting an exemplary processing procedure for handling access requests in a parallel operation mode of the first embodiment of the present technology.

FIG. 6 is a flowchart depicting an exemplary processing procedure for handling access requests in the parallel operation mode of the first embodiment of the present technology.

When the host computer 100 issues a command to the storage system, the cache determination section 210 determines whether or not the access target data is held in the cache storage 400 (step S811). Items of metadata such as the result of the determination, the data size of the access request, and the type of the access request are collected by the operation mode management section 260 for use in calculating the cache hit ratio and controlling the operation mode.

In the case of a cache hit (Yes in step S812), a cache storage access request is generated from the cache area registration information managed in the cache data management table 250 and from the configuration information regarding the access request (step S831). The cache storage access request section 240 then accesses the cache storage 400 (step S832).

In the case where a cache mishit occurs (No in step S812), an access request to the master storage 300 is generated (step S821). The master storage access request section 230 then accesses the master storage 300 for a read or write operation (step S822).

Regardless of a cache hit or a mishit having occurred, the cache data management table 250 is updated as needed (step S833). For example, the re-access distance counter 257 and the counter clear count 258 are updated as discussed above. Thereafter, a process of responding to the access request is performed (step S834).

Figure 7:
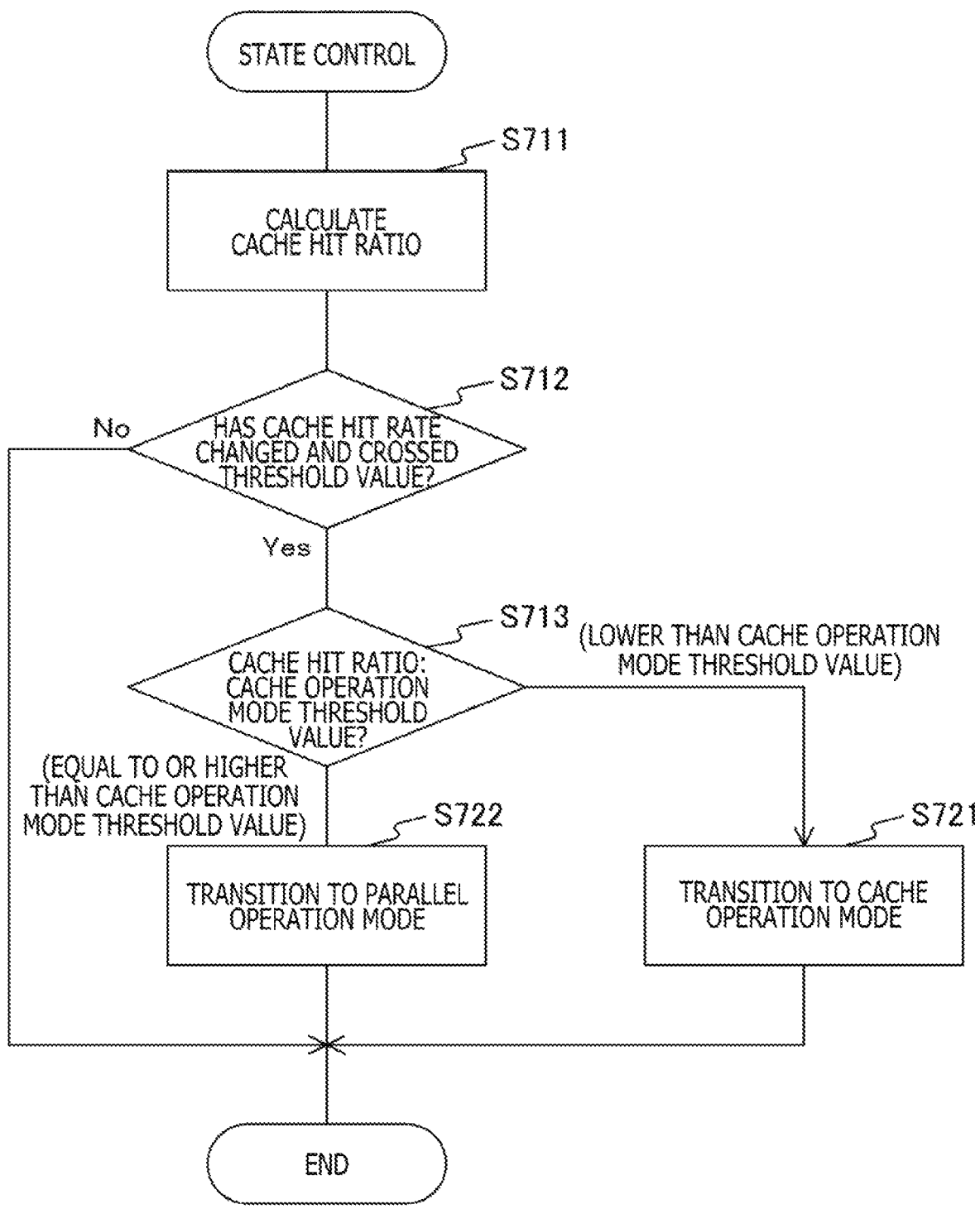
FIG. 7 is a flowchart depicting an exemplary processing procedure for the state control of operation modes in the first embodiment of the present technology.

FIG. 7 is a flowchart depicting an exemplary processing procedure for the state control of operation modes in the first embodiment of the present technology.

On the basis of the information from the cache determination section 210, the operation mode management section 260 calculates the cache hit ratio (step S711). If, as a result of the calculation, the cache hit ratio has changed and crossed the cache operation mode threshold value (Yes in step S712), the transition is made to occur between operation modes as follows.

If the cache hit ratio becomes equal to or higher than the cache operation mode threshold value (step S713: equal to or higher than cache operation mode threshold value), the operation mode management section 260 causes the operation mode to transition to the parallel operation mode (step S722). On the other hand, if the cache hit ratio drops below the cache operation mode threshold value (step S713: lower than cache operation mode threshold value), the operation mode management section 260 causes the operation mode to transition to the cache operation mode (step S721).

In the first embodiment of the present technology, a mode is added in which the master storage 300 and the cache storage 400 are allowed to operate in parallel with each other as described above. This averts the drop in performance caused by cache data swapping.

For example, suppose that the response speed of the master storage 300 is 20 μs (microseconds), that the number of access requests that can be processed per second (1 s) by the master storage 300 (IOPS) is 50,000, that the response speed of the cache storage 400 is 2 μs, and that the IOPS of the cache storage 400 is 500,000. In the case where a mishit has occurred for a write request, the processing time for a single access request is 22 μs covering the execution of a read operation from the cache storage 400, of a write operation to the master storage 300, and of a write operation to the cache storage 400. In the case of a read request, it is further necessary to perform a read operation from the master storage 300, which amounts to a processing time of 42 μs.

In the case where the cache hit ratio is 90%, the above-described process needs to be carried out on 10% of the access requests. Thus, the maximum IOPS is obtained using the following formula:

$$1\ s/(0.9 \times 2\ \mu s + 0.1 \times 22\ \mu s) = 250{,}000$$

Meanwhile, in the case where the master storage 300 and the cache storage 400 are caused to operate in parallel with each other, the storage devices can process their access requests independently of each other. Thus, the maximum IOPU is obtained using the following formula:

$$500{,}000 + 50{,}000 = 550{,}000$$

In this case, the cache hit ratio is 90.9% given the following formula:

$$500{,}000/550{,}000 \approx 90.9\%$$

It is thus understood that in a state where the cache hit ratio is reasonably high, the performance of the storage system can be doubled in the parallel operation mode even with approximately the same cache hit ratio. Therefore, when an appropriate operation mode is used in keeping with the cache hit ratio as with the first embodiment of the present technology, the performance of the storage system is improved.

2. Second Embodiment

In the first embodiment, when the cache hit ratio becomes high enough to exceed a certain range, few access requests to the master storage 300 may take place. This may lead to a longer idle time in which no process occurs on the master storage 300. That is, the storage system may fail to perform at its full potential. Thus, in a second embodiment of the present technology, with throughput falling, a process is performed to write back the cached data with low use frequency. This reduces the load of the write-back process in the cache operation mode and further improves the performance of the storage system.

The overall configuration of the information processing system in the second embodiment is similar to that of the first embodiment and thus will not be discussed further in detail.

[Configuration of the Storage Controller]

Figure 8:
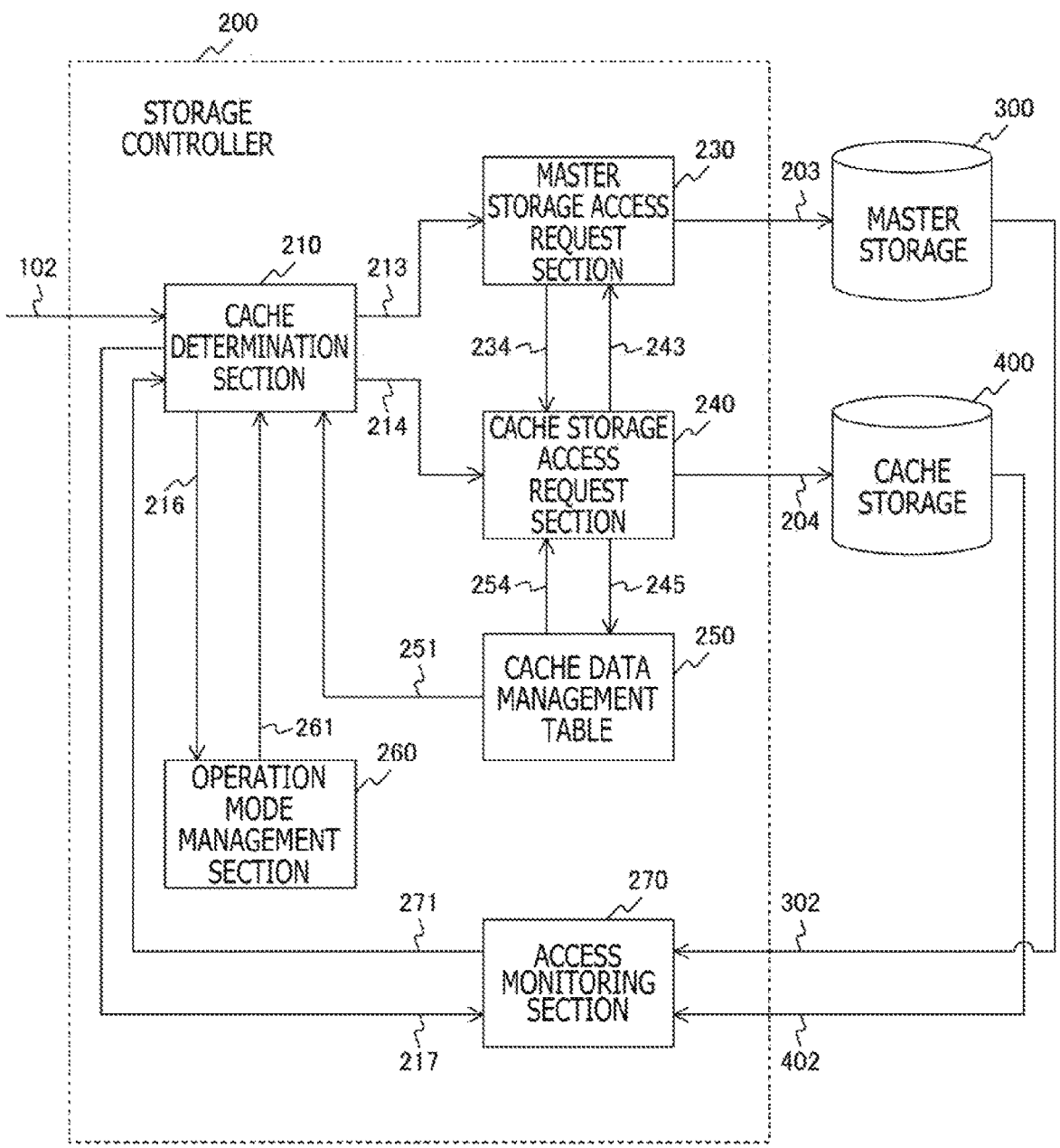
FIG. 8 is a schematic diagram depicting an exemplary configuration of a storage controller 200 in a second embodiment of the present technology.

FIG. 8 depicts an exemplary configuration of the storage controller 200 in the second embodiment of the present technology. The storage controller 200 in the second embodiment differs from the first embodiment in that an access monitoring section 270 is added. The remaining configuration of the second embodiment is similar to that of the first embodiment.

The access monitoring section 270 monitors access requests inside the storage system to oversee the performance of the storage system with respect to these requests. The access monitoring section 270 receives the processing state of the master storage 300 via a signal line 302. The access monitoring section 270 also receives the processing state of the cache storage 400 via a signal line 402. The access monitoring section 270 further receives, via a signal line 217, the configuration information regarding access requests to the master storage 300 and to the cache storage 400. This allows the access monitoring section 270 to acquire throughput information regarding the processing by the master storage 300 and the cache storage 400.

The access monitoring section 270 supplies the throughput information thus acquired to the cache determination section 210 via a signal line 271. On the basis of the throughput information, the cache determination section 210 determines whether or not to perform a cached data write-back process.

[Operation Mode]

Figure 9:
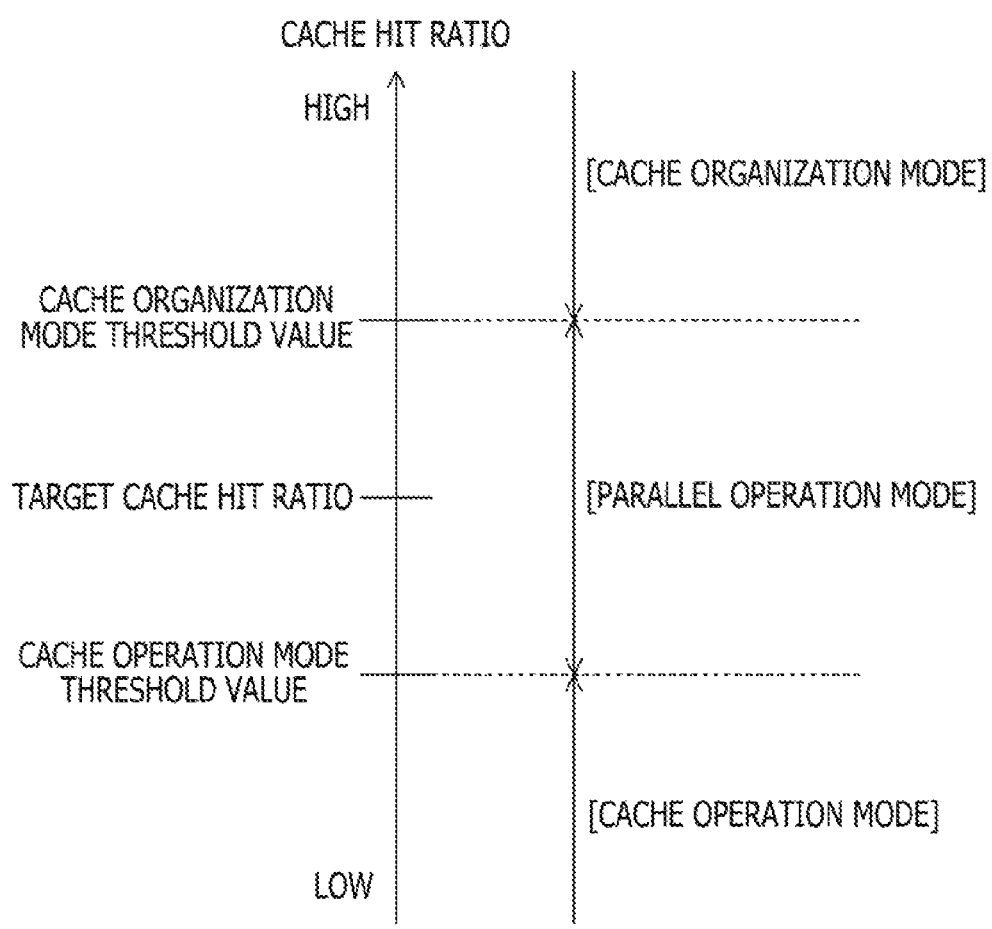
FIG. 9 is a schematic diagram depicting exemplary relations between operation modes on one hand and a cache hit ratio on the other hand in the second embodiment of the present technology.

FIG. 9 depicts exemplary relations between operation modes on one hand and the cache hit ratio on the other hand in the second embodiment of the present technology.

As with the above-described first embodiment, the second embodiment assumes the cache operation mode and the parallel operation mode as the operation modes. The second embodiment additionally assumes a cache organization mode. The cache organization mode is a mode in which, unlike in the parallel operation mode, data swapping is not performed on the cache storage 400 while the cached data write-back process is carried out with throughput falling. That is, in a state where the cache hit ratio is raised with no data swapping performed on the cache storage 400, a drop in throughput serves to intentionally trigger execution of the cached data write-back process alone in advance.

As with the above-described first embodiment, the second embodiment calculates the target cache hit ratio based on the performance information regarding the master storage 300 and the cache storage 400. From the target cache hit ratio thus calculated, a cache operation mode threshold value and a cache organization mode threshold value are determined. The cache operation mode threshold value is lower than the target cache hit ratio. The cache organization mode threshold value is higher than the target cache hit ratio.

Figure 10:
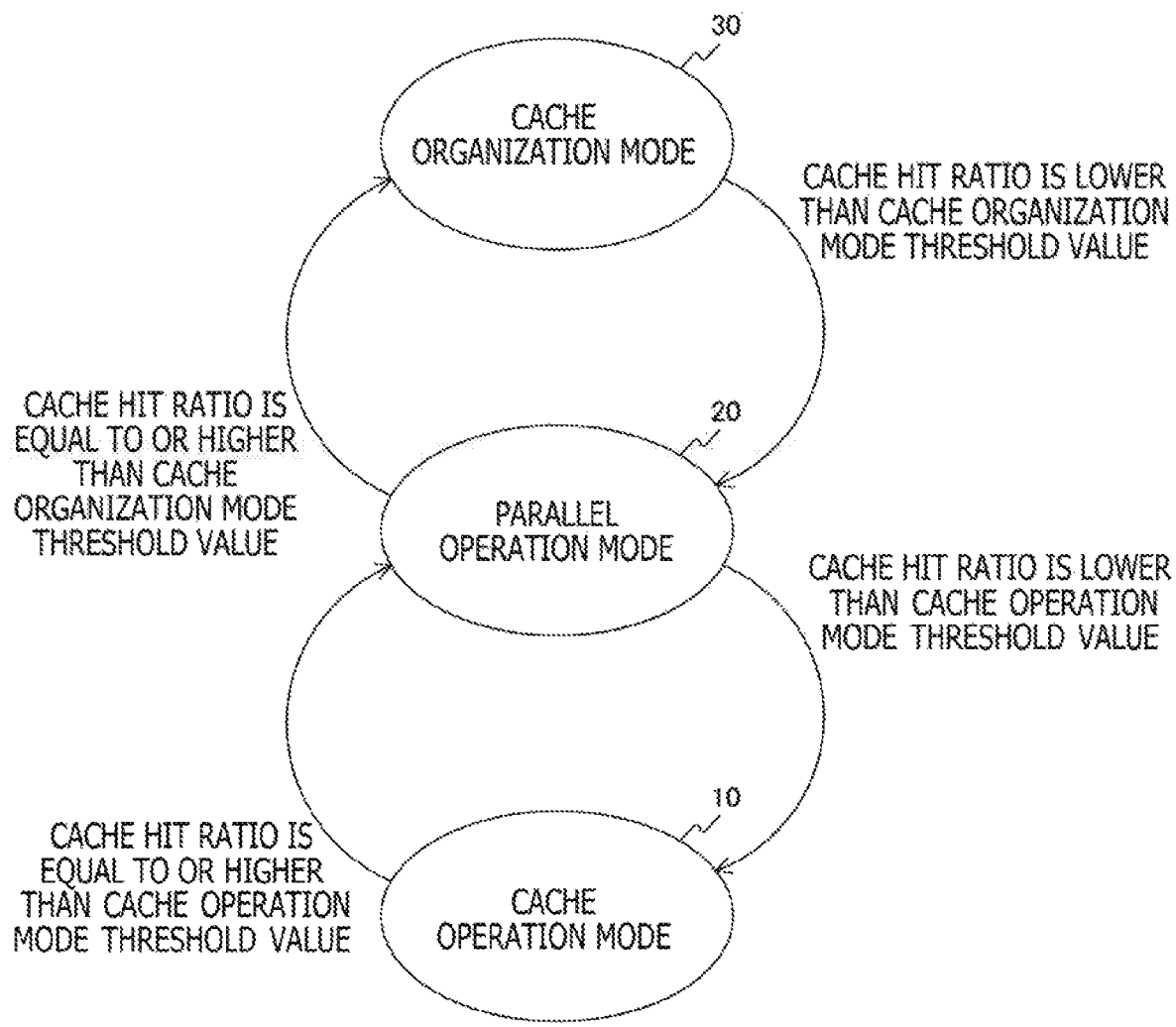
FIG. 10 is a schematic diagram depicting exemplary transitions between operation modes in the second embodiment of the present technology.

FIG. 10 depicts exemplary transitions between operation modes in the second embodiment of the present technology. As discussed above, the second embodiment assumes three operation modes: a cache operation mode 10, a parallel operation mode 20, and a cache organization mode 30.

If the cache hit ratio becomes equal to or higher than the cache operation mode threshold value during operation in the cache operation mode 10, the operation mode management section 260 causes the operation mode to transition from the cache operation mode 10 to the parallel operation mode 20.

If the cache hit ratio becomes equal to or higher than the cache organization mode threshold value during operation in the parallel operation mode 20, the operation mode management section 260 causes the operation mode to transition from the parallel operation mode 20 to the cache organization mode 30.

If the cache hit ratio drops below the cache organization mode threshold value during operation in the cache organization mode 30, the operation mode management section 260 causes the operation mode to transition from the cache organization mode 30 to the parallel operation mode 20.

If the cache hit ratio drops below the cache operation mode threshold value during operation in the parallel operation mode 20, the operation mode management section 260 causes the operation mode to transition from the parallel operation mode 20 to the cache operation mode 10.

[Operation]

With the second embodiment of the present technology, the processing procedure for handling access requests in the cache operation mode and in the parallel operation mode is similar to that of the above-described first embodiment and thus will not be discussed further in detail.

Also, the processing procedure for handling access requests in the cache organization mode is similar to that of the above-described first embodiment in the parallel operation mode. That is, in the cache organization mode as in the parallel operation mode, the cache hit ratio is equal to or higher than the cache operation mode threshold value. Thus, data swapping is not performed on the cache storage 400 in the cache organization mode as well. For this reason, the processing procedure for handling access requests in the cache organization mode will not be discussed further in detail.

Figure 11:
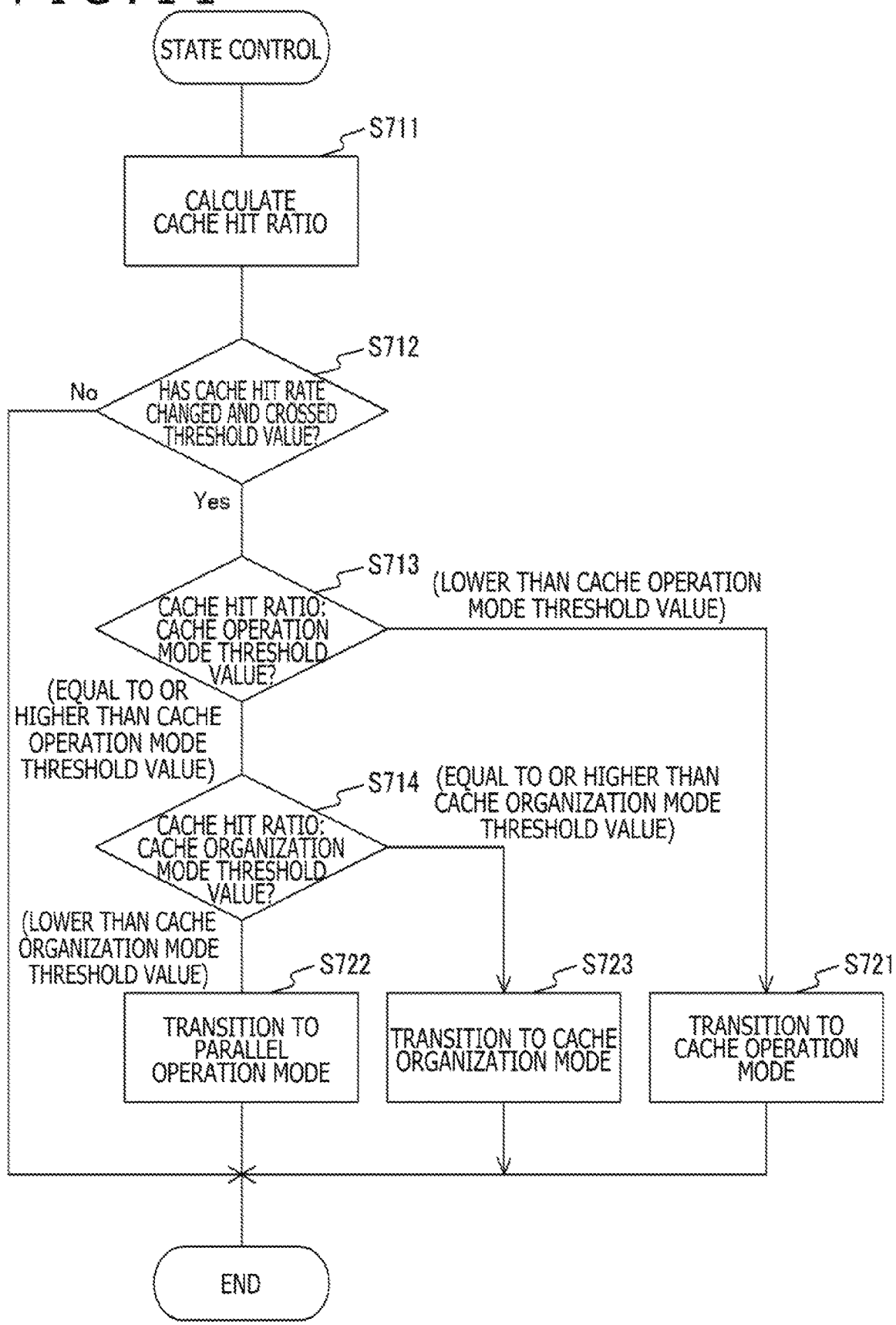
FIG. 11 is a flowchart depicting an exemplary processing procedure for the state control of operation modes in the second embodiment of the present technology.

FIG. 11 is a flowchart depicting an exemplary processing procedure for the state control of operation modes in the second embodiment of the present technology.

The operation mode management section 260 calculates the cache hit ratio based on the information from the cache determination section 210 (step S711). If, as a result of this, the cache hit ratio has changed and crossed the cache operation mode threshold value (Yes in step S712), the operation mode management section 260 causes the operation mode to transition as follows.

If the cache hit ratio drops below the cache operation mode threshold value (step S713: lower than cache operation mode threshold value), the operation mode management section 260 causes the operation mode to transition to the cache operation mode (step S721).

If the cache hit ratio becomes equal to or higher than the cache operation mode threshold value and lower than the cache organization mode threshold value (step S714: lower than cache organization mode threshold value), the operation mode management section 260 causes the operation mode to transition to the parallel operation mode (step S722).

If the cache hit ratio becomes equal to or higher than the cache organization mode threshold value (step S714: equal to or higher than cache organization mode threshold value), the operation mode management section 260 causes the operation mode to transition to the cache organization mode (step S723).

Figure 12:
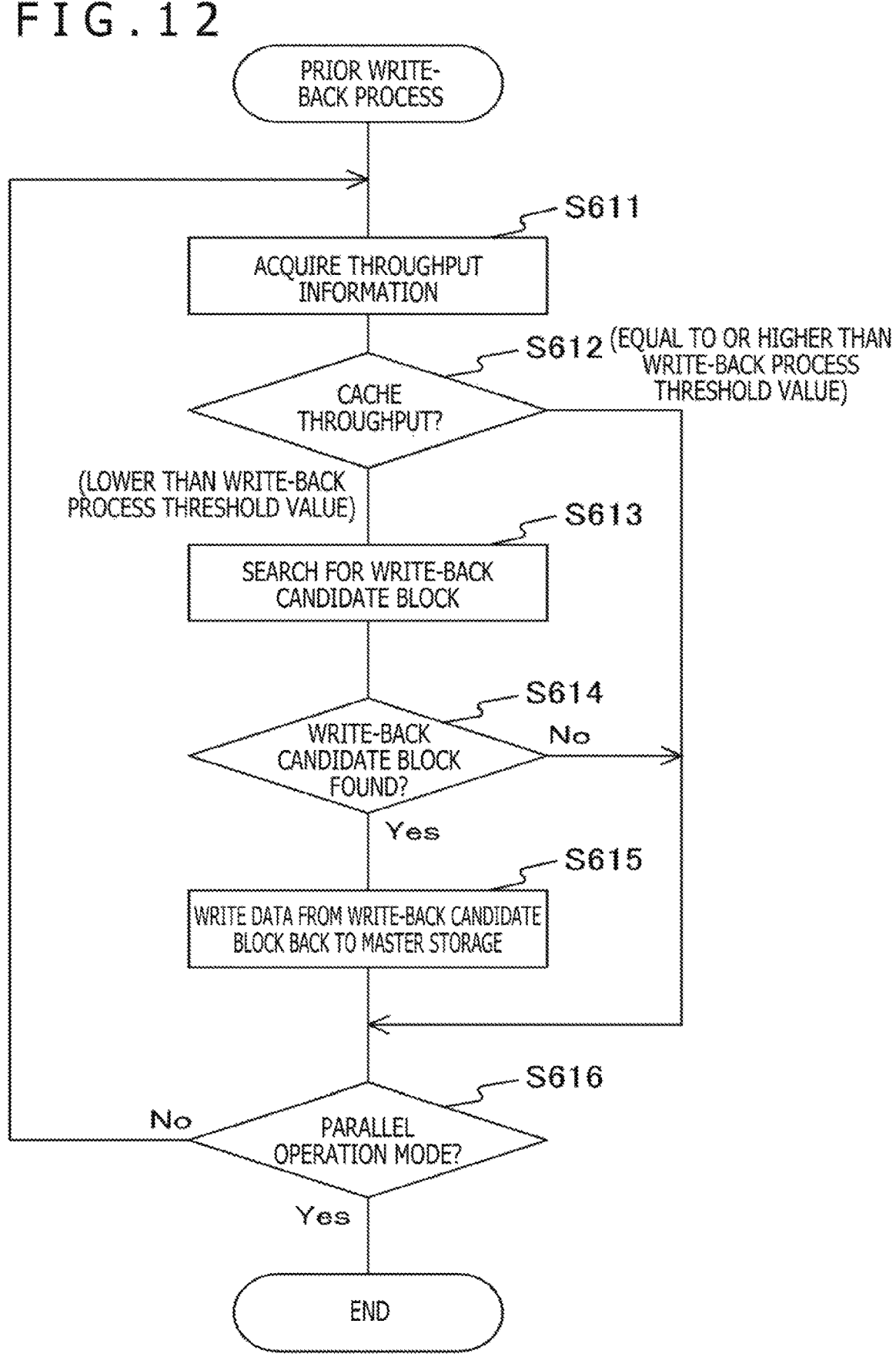
FIG. 12 is a flowchart depicting an exemplary processing procedure for a prior write-back process in the second embodiment of the present technology.

FIG. 12 is a flowchart depicting an exemplary processing procedure for a prior write-back process in the second embodiment of the present technology. In the second embodiment, with throughput falling as discussed above, a process is performed to write back the cached data with low use frequency. The prior write-back process is executed independently of and in parallel with the processing of other access requests.

In this example, the operation mode transitioning to the cache organization mode or to the cache operation mode is used as a trigger to perform the processing to be explained below. Thus, it is assumed that the prior write-back process is performed not in the parallel operation mode but in the cache organization mode or in the cache operation mode. However, this is only an example. The prior write-back process may also be carried out in the parallel operation model. Even in this case, the performance of the storage system as a whole can be guaranteed if the processing is allowed to proceed with throughput verified to be reasonably high.

In the ensuing example, whether or not to perform the prior write-back process is determined by focusing on the throughput of the cache storage 400. That is, the throughput of the master storage 300 is not monitored in this example. The reason for this is that in the cache organization mode, the cache hit ratio is high, so that a high percentage of accesses presumably occur to the cache storage 400 and a low percentage of accesses to the master storage 300. In the cache operation mode, the cache storage 400 is accessed upon a cache mishit for cache registration, with the master storage 300 presumably accessed with low frequency. Although this example focuses on the throughput of the cache storage 400 as described above, the throughput of the master storage 300 may be verified concurrently so as to minimize the effects on the storage system.

The access monitoring section 270 acquires throughput information and supplies it to the cache determination section 210 (step S611). If the throughput of the cache storage 400 is equal to or higher than a write-back process threshold value (step S612: equal to or higher than write-back process threshold value), the cache determination section 210 does not perform the prior write-back process.

If the throughput of the cache storage 400 is lower than the write-back process threshold value (step S612: lower than write-back process threshold value), the cache determination section 210 refers to the cache data management table 250 to search for a write-back candidate block (step S613). At this point, a block with low use frequency is searched for by referring to the re-access distance counter 257 and counter clear count 258. For the purpose of the search, there may be provided a data structure (e.g., list structure) in which write-back candidate blocks are listed beforehand. If no write-back candidate block is found (No in step S614), the prior write-back process is not performed.

If a write-back candidate block is found (Yes in step S614), the data written in the write-back candidate block is read from the cache storage 400 and written back to the master storage 300 (step S615). At this point, the write-back process is performed on a block of which the dirty flag 256 is set to "dirty." After the write-back process, the dirty flag 256 is set to "clean." Thereafter, the write-back of the data is not needed upon a mishit. The block can then be reused by simply resetting the corresponding in-use flag 255 to "not in use."

The above processing procedure is executed repeatedly in the case where the operation mode is the cache organization mode or the cache operation mode. That is, when the operation mode transitions to the parallel operation mode (Yes in step S616), the prior write-back process is terminated.

In the second embodiment of the present technology described above, with throughput falling, the write-back process is performed on the cache data with low use frequencies. This eliminates the need for the write-back process upon a mishit and improves the performance of the entire system.

For example, given 500,000 accesses, a 95% cache hit ratio translates into 475,000 accesses to the cache storage 400 and 25,000 accesses to the master storage 300. This provides each storage device with a bandwidth margin to spare. The eviction process is then carried out on the spare bandwidth, which permits processing without a drop in performance and without affecting the commands from the host computer 100.

The embodiments described above are merely examples in which the present technology may be implemented. The particulars of the embodiments correspond to the inventive matters claimed in the appended claims. Likewise, the inventive matters named in the appended claims correspond to the particulars of the embodiments with the same names in the foregoing description of the preferred embodiments of the present technology. However, these embodiments and other examples are not limitative of the present technology that may also be implemented using various modifications and alterations of the embodiments so far as they are within the scope of the appended claims.

The procedures discussed above in connection with the embodiments may be construed as constituting a method having a series of such procedures. Also, the procedures may be construed as forming a program for causing a computer to execute a series of such procedures, or as constituting a recording medium storing such a program. The recording medium may be a CD (Compact Disc), an MD (MiniDisc), a DVD (Digital Versatile Disc), a memory card, or a Blu-ray (registered trademark) Disc, for example.

The advantageous effects stated in the description are only examples and not limitative of the present technology that may also provide other advantages.

The present disclosure may be implemented preferably in the following configurations:

(1) A storage controller including:

an access request section configured to request access to a first storage and to a second storage that is higher in response speed than the first storage, the second storage storing part of data stored in the first storage; and an operation management section configured to manage, based on a usage state of the second storage, whether or not to transfer from the first storage to the second storage data targeted for access but not stored in the second storage.

(2) The storage controller as stated in paragraph (1) above, in which the operation management section determines the usage state of the second storage in accordance with a hit ratio at which access target data has been stored in the second storage.

(3) The storage controller as stated in paragraph (2) above, in which the operation management section sets a cache operation mode in the case where the hit ratio is lower than a predetermined threshold value and sets a parallel operation mode in the case where the hit ratio is higher than the threshold value; and when access occurs to data not stored in the second storage, the access request section requests transfer of the data from the first storage to the second storage in the cache operation mode and does not request transfer of the data from the first storage to the second storage in the parallel operation mode.

(4) The storage controller as stated in any one of paragraphs (1) to (3) above, further including:

an access monitoring section configured to monitor access to the second storage so as to acquire a throughput of the second storage, in which the access request section selects, as write-back candidate data, data with low access frequency among data stored in the second storage, the access request section further requesting write-back of the write-back candidate data from the second storage to the first storage when the throughput of the second storage becomes lower than a predetermined value.

(5) The storage controller as stated in paragraph (4) above, in which the operation management section sets the cache operation mode in the case where the hit ratio is lower than a first threshold value, sets a cache organization mode in the case where the hit ratio is higher than a second threshold value that is higher than the first threshold value, and sets the parallel operation mode in the case where the hit ratio is between the first threshold value and the second threshold value; and when access occurs to data not stored in the second storage, the access request section requests transfer of the data from the first storage to the second storage in the cache operation mode, and does not request transfer of the data from the first storage to the second storage in the parallel operation mode or in the cache organization mode.

(6) The storage controller as stated in paragraph (5) above, in which the access request section requests the write-back of the write-back candidate data from the second storage to the first storage in the cache organization mode or in the cache operation mode, and does not request the write-back of the write-back candidate data in the parallel operation mode.

(7) A storage system including:

a first storage;

a second storage configured to be higher in response speed than the first storage and to store part of data stored in the first storage;

an access request section configured to request access to the first storage and to the second storage; and an operation management section configured to manage, based on a usage state of the second storage, whether or not to transfer from the first storage to the second storage data targeted for access but not stored in the second storage.

(8) A storage controller controlling method including the steps of:

causing an access request section to request access to a first storage and to a second storage that is higher in response speed than the first storage, the second storage storing part of data stored in the first storage; and causing an operation management section to manage, based on a usage state of the second storage, whether or not to transfer from the first storage to the second storage data targeted for access but not stored in the second storage.

(9) A program for causing a computer to execute a procedure including:

requesting access to a first storage and to a second storage that is higher in response speed than the first storage, the second storage storing part of data stored in the first storage; and managing, based on a usage state of the second storage, whether or not to transfer from the first storage to the second storage data targeted for access but not stored in the second storage.

REFERENCE SIGNS LIST

100 Host computer
200 Storage controller
210 Cache determination section
230 Master storage access request section
240 Cache storage access request section
250 Cache data management table
260 Operation mode management section
270 Access monitoring section
300 Master storage
400 Cache storage

The invention claimed is:

1. A storage controller, comprising:
an access request section configured to request access to
a first storage and to a second storage, wherein
the second storage is higher in response speed than the first storage, and
the second storage stores a part of data stored in the first storage; and
an operation management section configured to:
determine a usage state of the second storage based on a hit ratio at which data targeted for the access is stored in the second storage;
set a cache operation mode in a case where the hit ratio is lower than a specific threshold value;
set a parallel operation mode in a case where the hit ratio is higher than the specific threshold value,
wherein for the access to data not stored in the second storage,
transfer of the data from the first storage to the second storage is requested in the cache operation mode, and
the transfer of the data from the first storage to the second storage is not requested in the parallel operation mode.

2. The storage controller according to claim 1, further comprising:
an access monitoring section configured to:
monitor the access to the second storage; and
acquire a throughput of the second storage based on the monitored access,
wherein the access request section is further configured to:
select, as write-back candidate data, data with low access frequency among the data stored in the second storage; and
request write-back of the write-back candidate data from the second storage to the first storage when the throughput of the second storage is lower than a specific value.

3. The storage controller according to claim 2, wherein the operation management section is further configured to set a cache organization mode in a case where the hit ratio is higher than a threshold value that is higher than the specific threshold value.

4. The storage controller according to claim 3, wherein the access request section is further configured to request the write-back of the write-back candidate data from the second storage to the first storage in one of the cache organization mode or in the cache operation mode, and does not request the write-back of the write-back candidate data in the parallel operation mode.

5. A storage system, comprising:
a first storage;
a second storage configured to store a part of data stored in the first storage,
    wherein the second storage is higher in response speed than the first storage;
an access request section configured to request access to the first storage and to the second storage; and
an operation management section configured to:
    determine a usage state of the second storage based on a hit ratio at which data targeted for the access is stored in the second storage;
    set a cache operation mode in a case where the hit ratio is lower than a specific threshold value;
    set a parallel operation mode in a case where the hit ratio is higher than the specific threshold value,
        wherein for the access to data not stored in the second storage,
            transfer of the data from the first storage to the second storage is requested in the cache operation mode, and
            the transfer of the data from the first storage to the second storage is not requested in the parallel operation mode.

6. A storage controller controlling method, comprising:
requesting, by an access request section, access to a first storage and to a second storage, wherein
    the second storage is higher in response speed than the first storage, and
    the second storage stores a part of data stored in the first storage;
determining, by an operation management section a usage state of the second storage based on a hit ratio at which data targeted for the access is stored in the second storage;
setting a cache operation mode in a case where the hit ratio is lower than a specific threshold value;
setting a parallel operation mode in a case where the hit ratio is higher than the specific threshold value,
    wherein for the access to data not stored in the second storage,
        transfer of the data from the first storage to the second storage is requested in the cache operation mode, and
        the transfer of the data from the first storage to the second storage is not requested in the parallel operation mode.

7. A non-transitory computer-readable medium having stored thereon computer-executable instructions which, when executed by a computer, cause the computer to execute operations, the operations comprising:
requesting access to a first storage and to a second storage, wherein
    the second storage is higher in response speed than the first storage, and
    the second storage stores a part of data stored in the first storage;
determining a usage state of the second storage based on a hit ratio at which data targeted for the access is stored in the second storage;
setting a cache operation mode in a case where the hit ratio is lower than a specific threshold value;
setting a parallel operation mode in a case where the hit ratio is higher than the specific threshold value,
    wherein for the access to data not stored in the second storage,
        transfer of the data from the first storage to the second storage is requested in the cache operation mode, and
        the transfer of the data from the first storage to the second storage is not requested in the parallel operation mode.

* * * * *